(12) United States Patent
Kim

(10) Patent No.: US 7,894,031 B2
(45) Date of Patent: Feb. 22, 2011

(54) PIXEL STRUCTURE OF HORIZONTAL FIELD LIQUID CRYSTAL DISPLAY

(75) Inventor: Jaikwang Kim, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 316 days.

(21) Appl. No.: 12/128,674

(22) Filed: May 29, 2008

(65) Prior Publication Data

US 2009/0086149 A1 Apr. 2, 2009

(30) Foreign Application Priority Data

Sep. 29, 2007 (CN) .................. 2007 1 0175483

(51) Int. Cl.
*G02F 1/1337* (2006.01)
*G02F 1/1343* (2006.01)

(52) U.S. Cl. ................... 349/144; 349/129; 349/130

(58) Field of Classification Search ............. 349/129, 349/130, 144
See application file for complete search history.

(56) References Cited

U.S. PATENT DOCUMENTS 6,839,117 B1 1/2005 Park et al.
7,145,622 B2 * 12/2006 Kataoka et al. ............. 349/143
2003/0071952 A1 * 4/2003 Yoshida et al. ............. 349/141
2006/0146243 A1 * 7/2006 Nakanishi et al. .......... 349/139

FOREIGN PATENT DOCUMENTS

| JP | 2005-148534 | 6/2005 |
| KR | 10-0293434 | 4/2001 |
| KR | 10-2005-0070412 | 7/2005 |

OTHER PUBLICATIONS

English abstract of KR 10-0293434 dated Apr. 3, 2001.
English abstract of KR 10-2005-0070412 dated Jul. 7, 2005.
Patents abstracts of Japan and JPO computer English translation of JP 2005-148534 dated Jun. 9, 2005.

* cited by examiner

*Primary Examiner*—David Nelms
*Assistant Examiner*—David Y Chung
(74) *Attorney, Agent, or Firm*—Ladas & Parry LLP

(57) ABSTRACT

A pixel structure for a horizontal field LCD comprises a plurality of pixel units. Each of the pixel units comprises a gate line corresponding to the pixel unit, a data line corresponding to the pixel unit, and at least one TFT, wherein the TFT is electrically connected with the gate line and the data line, the gate line and the data line divide the pixel unit into four sub-pixels, the sub-pixel is provided with a pixel electrode which is electrically connected with the TFT, and the pixel electrode is provided with a plurality of slits in a predetermined direction.

18 Claims, 7 Drawing Sheets

PIXEL STRUCTURE OF HORIZONTAL FIELD LIQUID CRYSTAL DISPLAY

BACKGROUND OF THE INVENTION

The present invention relates to a pixel structure of a liquid crystal display (LCD).

An in-plane field switching (IPS) display rotates liquid crystal molecules by creating in-plane horizontal fields, and the horizontal fields are parallel with each other to improve the view angle performance of the LCD. The fringe field switching (FFS) display creates a fringe field between the electrodes, in which liquid crystal molecules between the electrodes and above the electrodes are rotated in plane for switching, so that the view angle performance of the LCD can be improved. However, as the display panel of a LCD increases in size, a horizontal field LCD like an IPS LCD and an FFS LCD cannot any more meet the requirements concerning the view angle of a large size LCD, especially for the wide screen LCD over 40 inch.

In both the IPS LCD and FFS LCD, the pixel structure in the display panel forms the view angle in a same direction. Thus, when the view angle of an observer is not consistent with the view angle of the pixel structure, the observer cannot see a normal image. In addition, when the view angle of the observer is approaching the limit of view angle of the display, the color deviation becomes so great that the visual effect of the observer is adversely affected.

In addition, dark spots usually appear in a large size LCD. That is, there is one or more pixels damaged in the display panel of the LCD during manufacture, and these pixels cannot function properly, which result in dark spots on the display panel and adversely influence the display quality of the LCD.

SUMMARY OF THE INVENTION

According to an aspect of the present invention, there is provided a pixel structure for a horizontal field LCD, comprising a plurality of pixel units. Each of the pixel units comprises a gate line corresponding to the pixel unit, a data line corresponding to the pixel unit, and at least one TFT. The TFT is electrically connected with the gate line and the data line, the gate line and the data line divide the pixel unit into four sub-pixels, the sub-pixel is provided with a pixel electrode which is electrically connected with the TFT, and the pixel electrode is provided with a plurality of slits in predetermined directions.

Preferably, the areas for the sub-pixels are equal with each other.

Preferably, the angle between the slits in the first sub-pixel and the gate line is $(n\pi/2)+\theta$, the angle between the slits in the second sub-pixel and the gate line is $[(n+1)\pi/2]+\theta$, the angle between the slits in the third sub-pixel and the gate line is $[(n+2)\pi/2]+\theta$, and the angle between the slits in the fourth sub-pixel and the gate line is $[(n+3)\pi/2]+\theta$; or the angle between the slits in the first sub-pixel and the data line is $(n\pi/2)+\theta$, the angle between the slits in the second sub-pixel and the data line is $[(n+1)\pi/2]+\theta$, the angle between the slits in the third sub-pixel and the data line is $[(n+2)\pi/2]+\theta$, and the angle between the slits in the fourth sub-pixel and the data line is $[(n+3)\pi/2]+\theta$, n is a natural number, $\pi$ is 180°, and $0 \leq \theta \leq 90°$.

Preferably, the angle between the slits in the first sub-pixel and the gate line is $n\pi+\theta$, the angle between the slits in the second sub-pixel and the gate line is $n\pi-\theta$, the angle between the slits in the third sub-pixel and the gate line is $(n+1)\pi+\theta$, and the angle between the slits in the fourth sub-pixel and the gate line is $(n+1)\pi-\theta$; or the angle between the slits in the first sub-pixel and the gate line is $n\pi-\theta$, the angle between the slits in the second sub-pixel and the gate line is $n\pi+\theta$, the angle between the slits in the third sub-pixel and the gate line is $(n+1)\pi-\theta$, and the angle between the slits in the fourth sub-pixel and the gate line is $(n+1)\pi+\theta$; or the angle between the slits in the first sub-pixel and the data line is $n\pi+\theta$, the angle between the slits in the second sub-pixel and the data line is $n\pi-\theta$, the angle between the slits in the third sub-pixel and the data line is $(n+1)\pi+\theta$, and the angle between the slits in the fourth sub-pixel and the data line is $(n+1)\pi-\theta$; or the angle between the slits in the first sub-pixel and the data line is $n\pi-\theta$, the angle between the slits in the second sub-pixel and the data line is $n\pi+\theta$, the angle between the slits in the third sub-pixel and the data line is $(n+1)\pi-\theta$, and the angle between the slits in the fourth sub-pixel and the data line is $(n+1)\pi+\theta$; n is a natural number, $\pi$ is 180°, and $0 \leq \theta \leq 90°$.

Preferably, the slits in the sub-pixels, which are not adjacent with each other, are parallel with each other.

Preferably, the slits in adjacent sub-pixels are perpendicular with each other.

Preferably, the slits in adjacent sub-pixels are symmetric with each other with respect to the gate line, and the slits in adjacent sub-pixels are symmetric with each other with respect to the data line.

Preferably, one TFT is provided in each of the pixel unit, the TFT is electrically connected with the pixel electrode in one of the sub-pixels, and the pixel electrodes in different sub-pixels are electrically connected with each other.

Preferably, two TFTs are provided in each of the pixel unit, and each of the TFTs is electrically connected with the pixel electrodes in two sub-pixels, respectively.

Preferably, two TFTs are provided in each of the pixel unit, each of the TFTs is electrically connected with the pixel electrode in one of sub-pixels, respectively, and the pixel electrode, which is electrically connected with the TFT, is electrically connected with the other pixel electrode, which is not electrically connected with the TFT.

Preferably, four TFTs are provided in each of the pixel unit, and each of the TFTs is electrically connected with the pixel electrode in one of the sub-pixels.

Preferably, the horizontal field is an in-plane field switching horizontal field or a fringe field switching horizontal field.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

The embodiments of the present invention provide a pixel structure of a horizontal field LCD, and the pixel structure comprises a plurality of pixel units. Each of the pixel units comprises a gate line corresponding to the pixel unit, a data line corresponding to the pixel unit, and at least one thin film transistor (TFT). The at least one TFT is electrically connected with the gate line and the data line, and the gate line and the data line divide the pixel unit into four sub-pixels. Each of the sub-pixels is provided with a pixel electrode, which is electrically connected with the TFT, and the pixel electrode is provided with a plurality of slits in a predetermined direction.

First Embodiment

Figure 1:
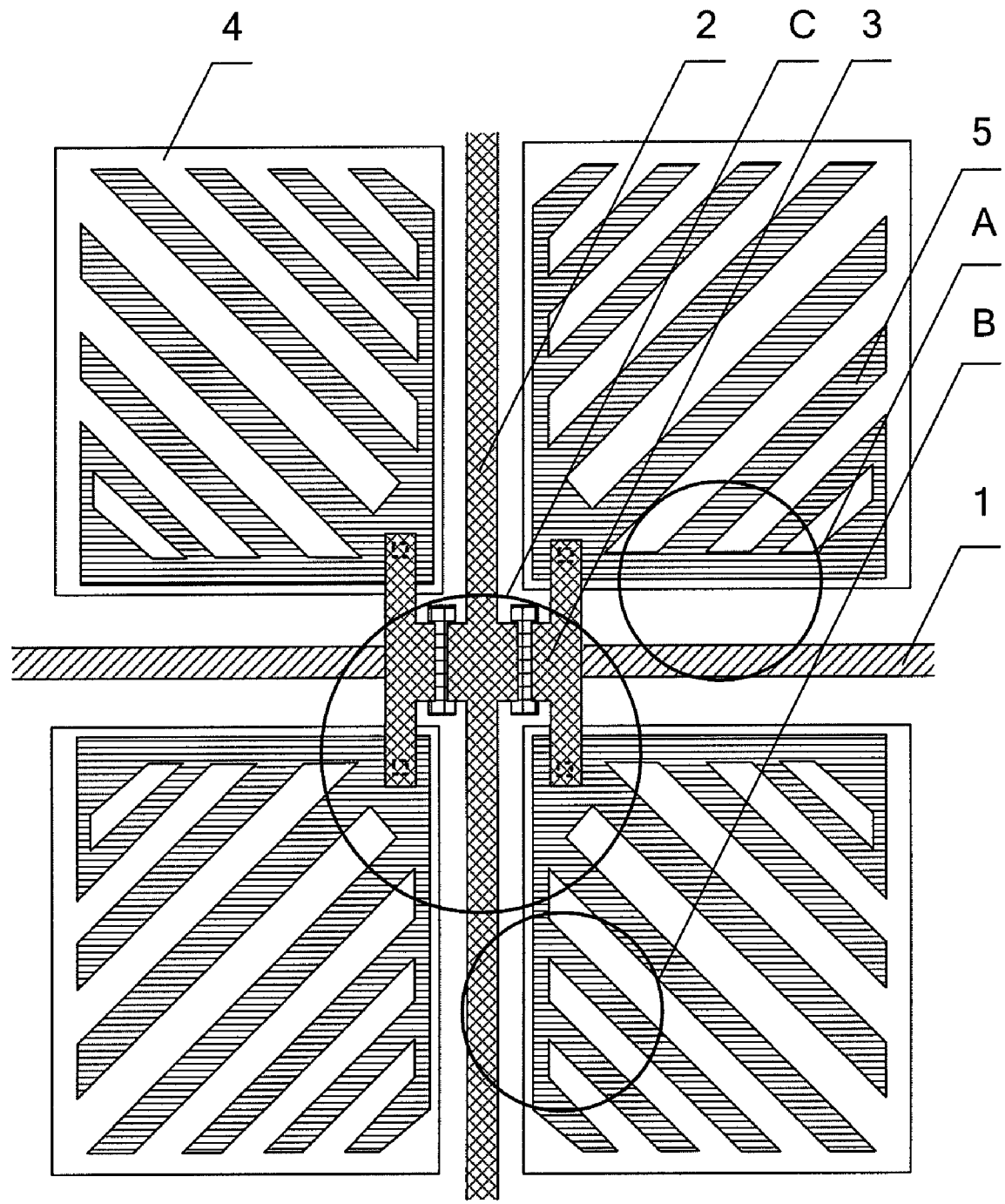
FIG. 1 is a structural diagram showing a pixel structure according to the first embodiment.

FIG. 1 is a structural diagram showing a pixel structure according to the first embodiment. As shown in FIG. 1, the pixel unit of the pixel structure comprises a gate line 1 corresponding to the pixel unit, a data line 2 corresponding to the pixel unit, two TFTs 3, four sub-pixels 4, and four pixel electrodes 5. The gate line 1 is arranged between the adjacent sub-pixels 4 of the pixel unit, the data line 2 is arranged between the adjacent sub-pixels 4 of the pixel unit, and the gate line 1 and data line 2 are perpendicular with each other. One of the TFTs 3 is electrically connected with the gate line 1, the data line 2, and two adjacent sub-pixels 4. One pixel electrode 5 is provided in each sub-pixel 4, and each of the pixel electrodes 5 is provided with a plurality of slits in a predetermined direction. Horizontal fields are created in the pixel unit for controlling the alignment of liquid crystal molecules.

In the pixel structure of the LCD according to this embodiment, horizontal fields are created to align the liquid crystal molecules, and horizontal fields in different directions are formed with the slits of the pixel electrodes, so that view angles are enlarged in different directions. Since the pixel unit of this embodiment forms the view angles in directions, as compared with the pixel structure of a conventional LCD in which the view angle is formed in only one direction, the present embodiment improves the view angle performance of the LCD. That is, the user can view the display panel in different directions at different view angles, and the visual effect is not affected. In addition, the four sub-pixels comprise the pixel unit, and the slits of each sub-pixel are formed in a different direction. Therefore, when the view angle of a user is approaching the limit of view angle of the LCD in a certain direction, the view angle of the user can be compensated by the view angles of the LCD formed in adjoining directions, so that the color deviation, which occurs when the user's view angle approaches the limit of view angle of the LCD in a certain direction, can be effectively avoided. Furthermore, when a pixel electrode is damaged during manufacture, the sub-pixels corresponding to the pixel electrode can be compensated with light from adjacent sub-pixels having slits in different directions, and the influence caused by the damaged pixel electrode can be effectively reduced.

In the present embodiment, the gate line and data line are perpendicular with each other to form an array structure, and can also intersect with each other at a predetermined angle to form another array structure. In addition, although the area for the sub-pixels is equal with each other in this embodiment, the area for the sub-pixels can be modified depending on the requirements of color display.

Figure 2:
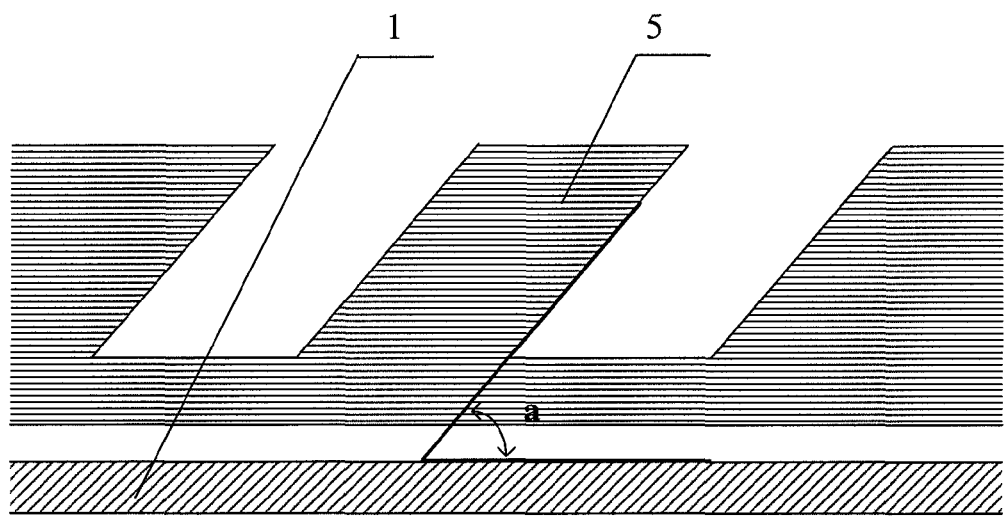
FIG. 2 is an enlarged view showing region A in FIG. 1.
Figure 3:
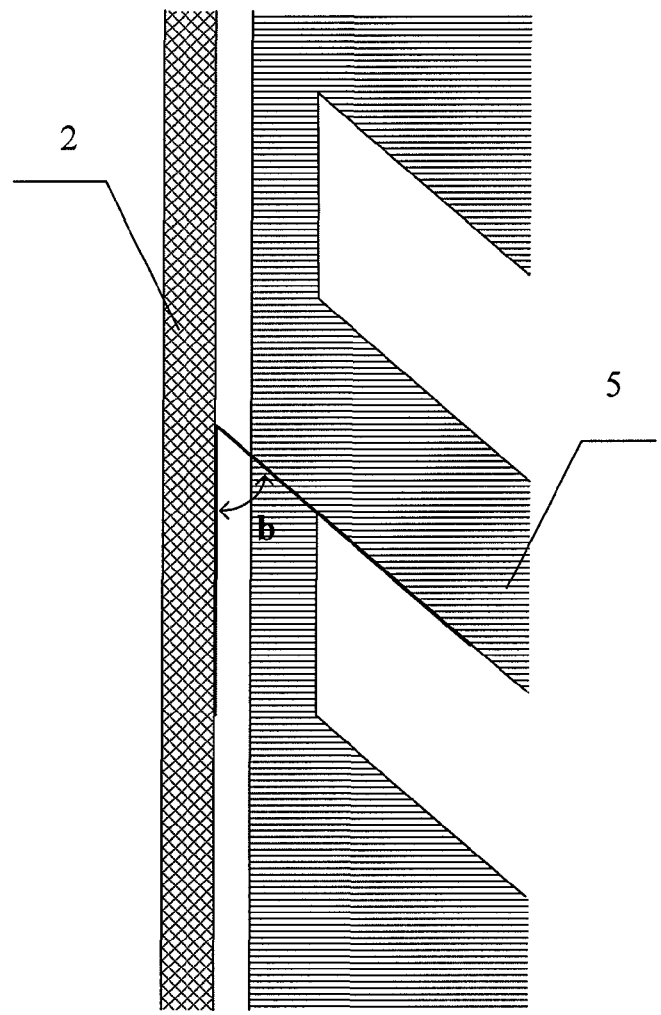
FIG. 3 is an enlarged view showing region B in FIG. 1.
Figure 4:
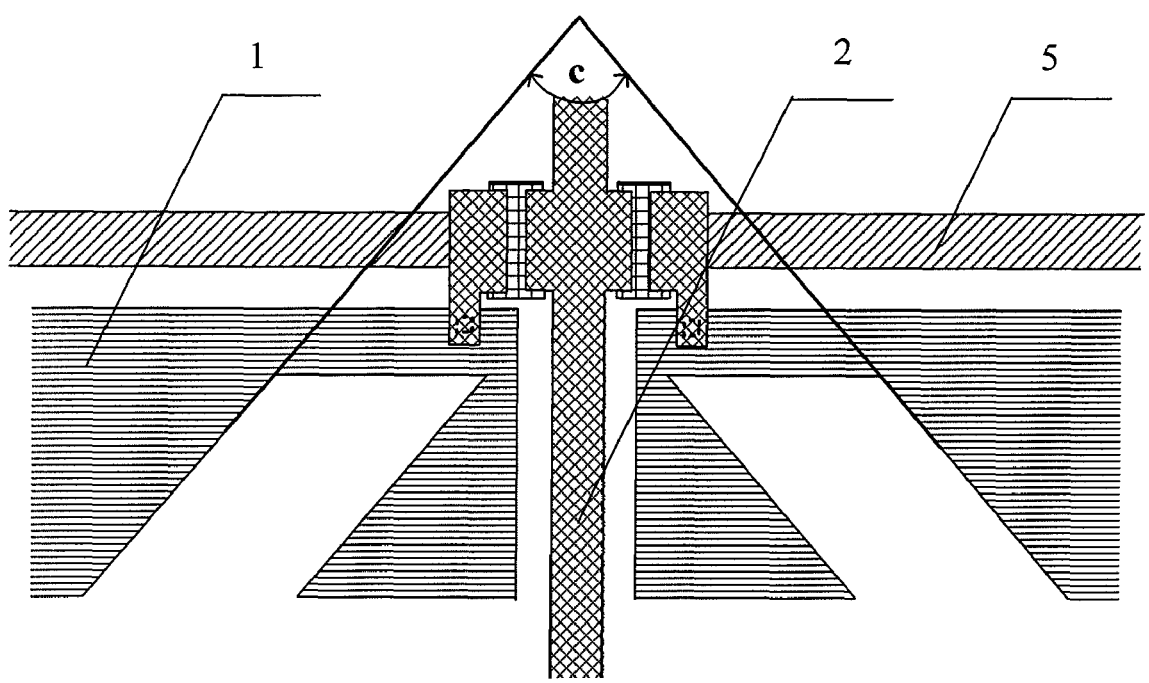
FIG. 4 is an enlarged view showing region C in FIG. 1.

FIG. 2 is an enlarged view showing region A in FIG. 1. As shown in FIG. 2, the angel between the gate line 1 and the slit of pixel electrode 5 is a. FIG. 3 is an enlarged view showing region B in FIG. 1. As shown in FIG. 3, the angel between the data line 2 and the slit of pixel electrode 5 is b. In practice, the angles a and b in each sub-pixels can be modified respectively, so that the slits of pixel electrodes in the sub-pixels are in different directions. The number of the slits of pixel electrodes can also be modified as necessary. FIG. 4 is an enlarged view showing region C in FIG. 1. As shown in FIG. 4, the angel between the slits of two sub-pixels is c. The angle c can also be modified as necessary.

As shown in FIG. 1, for example, the angle between the slits in the first sub-pixel and the gate line 1 is $(n\pi/2)+\theta$, the angle between the slits in the second sub-pixel and the gate line 1 is $[(n+1)\pi/2]+\theta$, the angle between the slits in the third sub-pixel and the gate line 1 is $[(n+2)\pi/2]+\theta$, and the angle between the slits in the fourth sub-pixel and the gate line 1 is $[(n+3)\pi/2]+\theta$, wherein n is a natural number, $\pi$ is 180°, and $0 \leq \theta \leq 90°$. It is assumed that n=0 and $\theta=45°$, the angle between the slits in the right upper sub-pixel (i.e., the first sub-pixel) and the gate line 1 is 45°, the angle between the slits in the left upper sub-pixel (i.e., the second sub-pixel) and the gate line 1 is 135°, the angle between the slits in the left lower sub-pixel (i.e., the third sub-pixel) and the gate line 1 is 225°, and the angle between the slits in the right lower sub-pixel (i.e., the fourth sub-pixel) and the gate line 1 is 315°.

Regardless of the value of $\theta$, the angle between the slits of pixel electrodes in adjacent sub-pixels is 90°. In the case that the angle between the slits in the first sub-pixel and the data line is $(n\pi/2)+\theta$, the angle between the slits in the second sub-pixel and the data line is $[(n+1)\pi/2]+\theta$, the angle between the slits in the third sub-pixel and the data line is $[(n+2)\pi/2]+\theta$, and the angle between the slits in the fourth sub-pixel and the data line is $[(n+3)\pi/2]+\theta$, the angle between the slit of pixel electrode in adjacent sub-pixels is 90°, which is not described for simplicity.

As shown in FIG. 1, for example, the angle between the slits in the first sub-pixel and the gate line 1 is $n\pi+\theta$, the angle between the slits in the second sub-pixel and the gate line 1 is $n\pi-\theta$, the angle between the slits in the third sub-pixel and the gate line 1 is $(n+1)\pi+\theta$, and the angle between the slits in the fourth sub-pixel and the gate line 1 is $(n+1)\pi-\theta$, wherein n is a natural number, $\pi$ is 180°, and $0 \leq \theta \leq 90°$. It is assumed that n=0 and $\theta=45°$, the angle between the slits in the right upper sub-pixel (i.e., the first sub-pixel) and the gate line 1 is 45°, the angle between the slits in the left upper sub-pixel (i.e., the second sub-pixel) and the gate line 1 is 135°, the angle between the slits in the left lower sub-pixel (i.e., the third sub-pixel) and the gate line 1 is 225°, and the angle between the slits in the right lower sub-pixel (i.e., the fourth sub-pixel) and the gate line 1 is 315°.

Regardless of the value of $\theta$, the slits of pixel electrodes formed in adjacent sub-pixels are symmetric with each other with respect to the gate line or the data line. That is, for the slits of adjacent pixel electrodes in the vertical direction, the slits are symmetric with each other with respect to the gate line, and for the slits of adjacent pixel electrodes in horizontal direction, the slits are symmetric with each other with respect to the data line. In the case that the angle between the slits in the first sub-pixel and the gate line is $n\pi-\theta$, the angle between the slits in the second sub-pixel and the gate line is $n\pi+\theta$, the angle between the slits in the third sub-pixel and the gate line is $(n+1)\pi-\theta$, and the angle between the slits in the fourth sub-pixel and the gate line is $(n+1)\pi+\theta$, or in the case that the angle between the slits in the first sub-pixel and the data line is $n\pi-\theta$, the angle between the slits in the second sub-pixel and the data line is $n\pi+\theta$, the angle between the slits in the third sub-pixel and the data line is $(n+1)\pi-\theta$, and the angle between the slits in the fourth sub-pixel and the data line is $(n+1)\pi+\theta$, the slits of pixel electrode formed in adjacent sub-pixels are symmetric with each other with respect to the gate line or the data line, which is not described for simplicity.

In addition, in the pixel unit of the present embodiment, the slits in pixel electrodes, which are not adjacent with each other, are centrosymmetric with respect to the center of the pixel unit.

Furthermore, the slits of pixel electrodes may be arranged to be parallel with the gate line or the data line, and the slits can be in a shape of a straight or curved line.

Furthermore, the horizontal field formed in the pixel unit of the present embodiment is an in-plane field switching horizontal field or a fringe field switching horizontal field, which are known in the art and thus are not described herein for simplicity.

Second Embodiment

Figure 5:
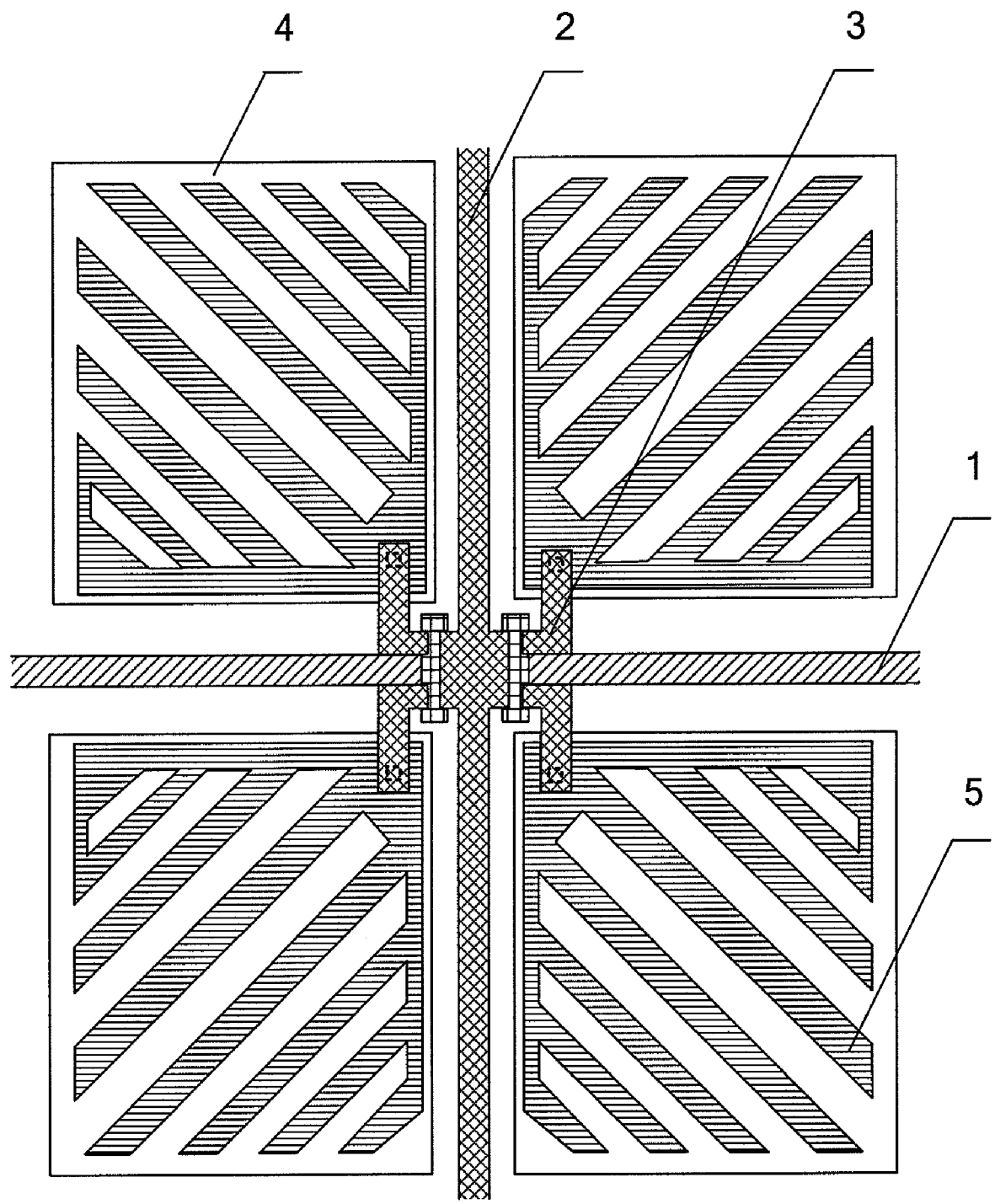
FIG. 5 is a structural diagram showing a pixel structure according to the second embodiment.

FIG. 5 is a structural diagram showing a pixel structure according to the second embodiment. As shown in FIG. 5, the pixel unit comprises a gate line 1 corresponding to the pixel unit, a data line 2 corresponding to the pixel unit, four TFTs 3, four sub-pixels 4, and four pixel electrodes 5. The gate line 1 is arranged between the adjacent sub-pixels 4 in the pixel unit, the data line 2 is arranged between the adjacent sub-pixels 4 in the pixel unit, and the gate line 1 and data line 2 are perpendicular with each other. One of the TFTs 3 is electrically connected with the gate line 1, the data line 2, and one sub-pixel 4, i.e., each of the TFTs 3 corresponds to one of the sub-pixels 4. One pixel electrode 5 is provided in each sub-pixel 4, and each of the pixel electrodes 5 is provided with a plurality of slits in a predetermined direction. Horizontal fields are created in the pixel unit for controlling the alignment of liquid crystal molecules.

According to the pixel structure of LCD in this embodiment, the pixel structure is constituted by a pixel unit with four TFTs to achieve the same technical effect as that of the first embodiment. In addition, since four TFTs are used to constitute the pixel unit, dark spots will not occur in two sub-pixels when one of the TFTs is damaged, which not only improves the display quality of the LCD, but also improves the tolerance capacity.

Third Embodiment

Figure 6:
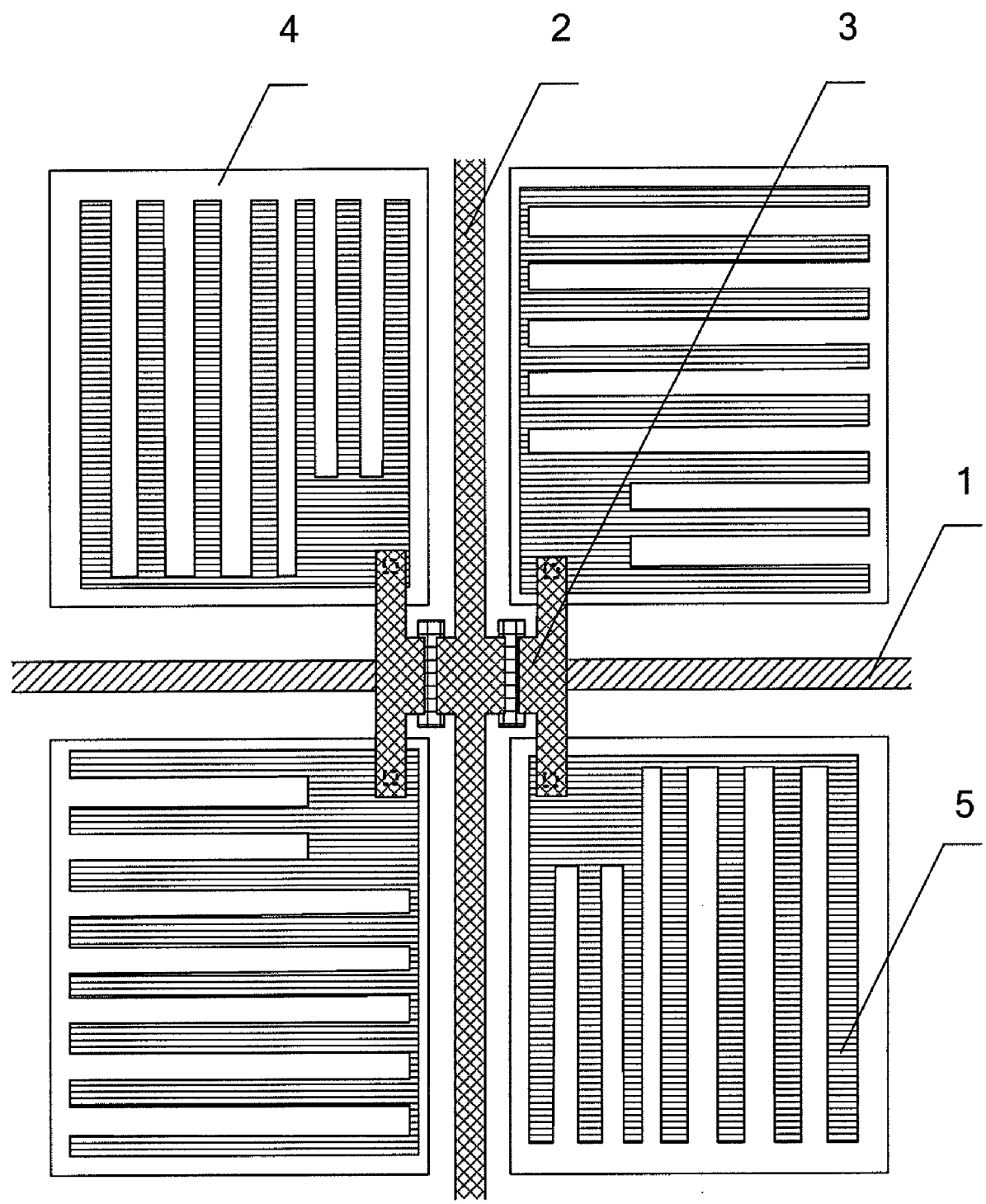
FIG. 6 is a structural diagram showing a pixel structure according to the third embodiment.

FIG. 6 is a structural diagram showing a pixel structure according to the third embodiment. As shown in FIG. 6, the pixel unit comprises a gate line 1 corresponding to the pixel unit, a data line 2 corresponding to the pixel unit, two TFTs 3, four sub-pixels 4, and four pixel electrodes 5. The gate line 1 is arranged between the adjacent sub-pixels 4 in the pixel unit, the data line 2 is arranged between the adjacent sub-pixels 4 in the pixel unit, and the gate line 1 and data line 2 are perpendicular with each other. One of the TFTs 3 is electrically connected with the gate line 1, the data line 2, and two adjacent sub-pixels 4. One pixel electrode 5 is provided in each sub-pixel 4. Each of the pixel electrodes 5 is provided with a plurality of slits in a predetermined direction, and the slits in adjacent pixel electrodes 5 form a right angle. The slits of two pixel electrodes 5 are parallel with the gate line 1, and the other two pixel electrodes 5 are parallel with the data line 2. Horizontal fields are created in the pixel unit for controlling the alignment of liquid crystal molecules.

According to the pixel structure of LCD in this embodiment, the angle between the slits of pixel electrodes is set to be a right angle, so that the view angles formed in different directions can be distributed uniformly, and the visual effect in different directions and view angles can be improved.

In addition, as shown in FIG. 6, the angle between the slits in the first sub-pixel and the gate line 1 is $(n\pi/2)+\theta$, the angle between the slits in the second sub-pixel and the gate line 1 is $[(n+1)\pi/2]+\theta$, the angle between the slits in the third sub-pixel and the gate line 1 is $[(n+2)\pi/2]+\theta$, and the angle between the slits in the fourth sub-pixel and the gate line 1 is $[(n+3)\pi/2]+\theta$, wherein n is a natural number, $\pi$ is 180°, and $0 \leq \theta \leq 90°$. It is assumed that n=0 and $\theta=0°$, then the angle between the slits in the right upper sub-pixel (i.e., the first sub-pixel) and the gate line 1 is 0°, the angle between the slits in the left upper sub-pixel (i.e., the second sub-pixel) and the gate line 1 is 90°, the angle between the slits in the left lower sub-pixel (i.e., the third sub-pixel) and the gate line 1 is 180°, and the angle between the slits in the right lower sub-pixel (i.e., the fourth sub-pixel) and the gate line 1 is 270°. In the case that the angle between the slits in the first sub-pixel and the data line is $(n\pi/2)+\theta$, the angle between the slits in the second sub-pixel and the data line is $[(n+1)\pi/2]+\theta$, the angle between the slits in the third sub-pixel and the data line is $[(n+2)\pi/2]+\theta$, and the angle between the slits in the fourth sub-pixel and the data line is $[(n+3)\pi/2]+\theta$, wherein n=0 and $\theta=90°$, the angle between the slits in the first sub-pixel and the data line is 90°, the angle between the slits in the second sub-pixel and the data line is 180°, the angle between the slits in the third sub-pixel and the data line is 270°, and the angle between the slits in the fourth sub-pixel and the data line is 360°, which is not described for simplicity.

Fourth Embodiment

Figure 7:
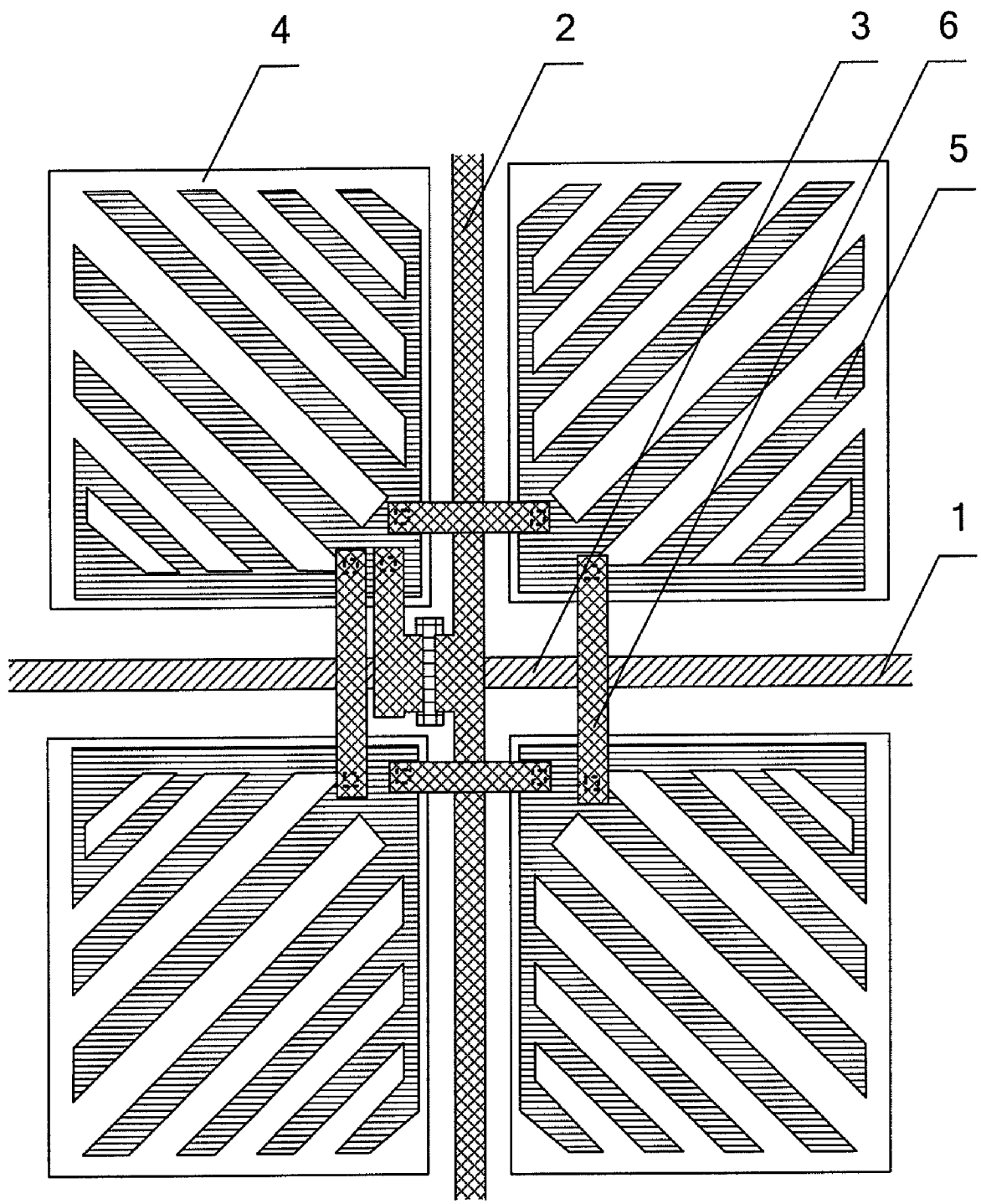
FIG. 7 is a structural diagram showing a pixel structure according to the fourth embodiment.

FIG. 7 is a structural diagram showing a pixel structure according to the fourth embodiment. As shown in FIG. 7, the pixel unit comprises a gate line 1 corresponding to the pixel unit, a data line 2 corresponding to the pixel unit, a TFT 3, four sub-pixels 4, and four pixel electrodes 5. The gate line 1 is arranged between the adjacent sub-pixels 4 in the pixel unit, the data line 2 is arranged between the adjacent sub-pixels 4 in the pixel unit, and the gate line 1 and data line 2 are perpendicular with each other. The TFT 3 is electrically connected with the gate line 1, the data line 2 and one of the sub-pixels 4. One pixel electrode 5 is provided in each sub-pixel 4. The pixel electrodes 5 in the adjacent sub-pixels 4 are electrically connected with each other with a conductive beam 6. Each of the pixel electrodes 5 is provided with a plurality of slits in a predetermined direction. A horizontal field is created in the pixel unit for controlling the alignment of liquid crystal molecules.

In addition, the conductive beams are used to electrically connect the pixel electrodes in adjacent sub-pixels, so the conductive beams can be made of the material for the pixel electrode or the metallic material for the data line. If the conductive beam is made of the material for the pixel electrode, the conductive beam can be formed simultaneously with the pixel electrode. If the conductive beam is made of the metallic material for the data line, the conductive beam can be formed simultaneously with the data line and the source/drain electrodes of the TFTs and can be electrically connected with the pixel electrode in adjacent sub-pixels through the via holes in the passivation layer.

Fifth Embodiment

Figure 8:
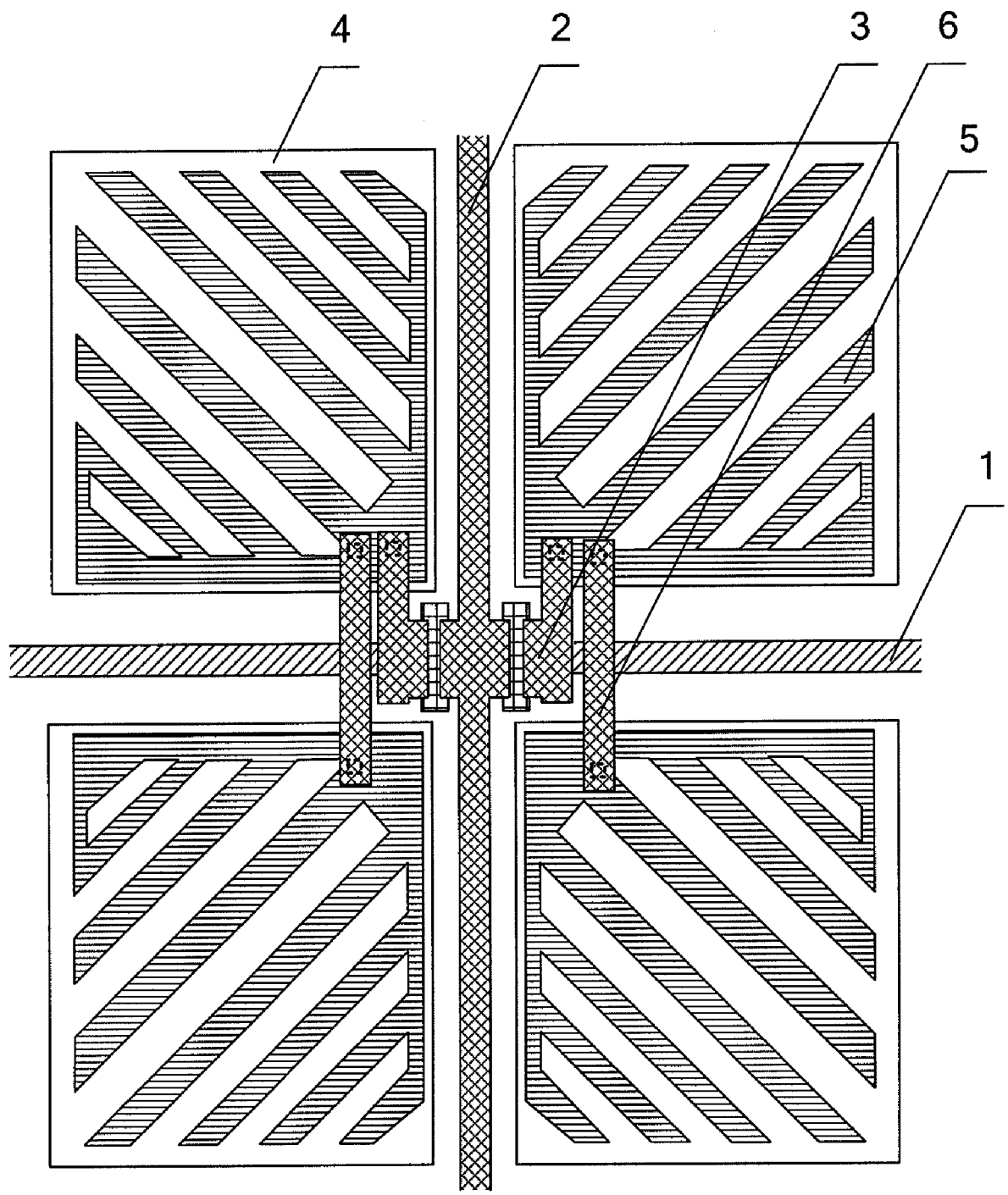
FIG. 8 is a structural diagram showing a pixel structure according to the fifth embodiment.

FIG. 8 is a structural diagram showing a pixel structure according to the fifth embodiment. As shown in FIG. 8, the pixel unit comprises a gate line 1 corresponding to the pixel unit, a data line 2 corresponding to the pixel unit, two TFTs 3, four sub-pixels 4, and four pixel electrodes 5. The gate line 1 is arranged between the adjacent sub-pixels 4 in the pixel unit, the data line 2 is arranged between the adjacent sub-pixels 4 in the pixel unit, and the gate line 1 and data line 2 are perpendicular with each other. One of the TFTs 3 is electrically connected with the gate line 1, the data line 2 and one of the sub-pixels 4. A pixel electrode 5 is provided in each sub-pixel 4. The pixel electrodes 5 electrically connected with the TFT 3 are electrically connected with the pixel electrode 5, which is not electrically connected with the TFT 3, via the conductive beam 6. Each of the pixel electrodes 5 is provided with a plurality of slits in a predetermined direction. Horizontal fields are created in the pixel unit for controlling the alignment of liquid crystal molecules.

In addition, the conductive beams are used to electrically connect the pixel electrodes in adjacent sub-pixels, so the conductive beams can be made of the material for the pixel electrode or the metallic material for the data line. If the conductive beam is made of the material for the pixel electrode, the conductive beam can be formed simultaneously with the pixel electrode. If the conductive beam is made of the metallic material for the data line, the conductive beam can be formed simultaneously with the data line and the source/drain electrode and can be electrically connected with the pixel electrode in adjacent sub-pixels through the via holes in the passivation layer.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. A pixel structure for a horizontal field liquid crystal display (LCD), comprising a plurality of pixel units, each of the pixel units comprising a gate line corresponding to the pixel unit, a data line corresponding to the pixel unit, and at least one thin film transistor (TFT), wherein the TFT is electrically connected with the gate line and the data line, the gate line and the data line divide the pixel unit into four sub-pixels, each of the sub-pixels is provided with a pixel electrode which is electrically connected with the TFT, and the pixel electrode is provided with a plurality of slits in a predetermined direction and wherein the angle between the slit in the first sub pixel and the gate line is $(n\pi/2)+\theta$, the angle between the slit in the second sub pixel and the gate line is $[(n+2)\pi/2]+\theta$, the angle between the slit in the third sub pixel and the gate line is $[(n+2)\pi/2]+\theta$, and the angle between the slit in the fourth sub pixel and the gate line is $[(n+3)\pi/2]+\theta$; or the angle between the slit in the first sub pixel and the data line is $(n+/2)+\theta$, the angle between the slit in the second sub pixel and the data line is $[(n+1)\pi/2]+\theta$ the angle between the slit in the third sub pixel and the data line is $[(n+2)\pi/2]+\theta$, and the angle between the slit in the fourth sub pixel and the data line is $[(n+3)\pi/2]+\theta$, and wherein n is a natural number, $\pi$ is 180°, and $0<\theta<90°$.

2. The pixel structure according to claim 1, wherein the areas for the sub-pixels are equal with each other.

3. The pixel structure according to claim 1 wherein the slits in the sub-pixels, which are not adjacent with each other, are parallel with each other.

4. The pixel structure according to claim 3, wherein the slits in adjacent sub-pixels are perpendicular with each other.

5. The pixel structure according to claim 3, wherein the slits in adjacent sub-pixels are symmetric with each other with respect to the gate line, and the slits in adjacent sub-pixels are symmetric with each other with respect to the data line.

6. The pixel structure according to claim 3, wherein one TFT is provided in each of the pixel unit, the TFT is electrically connected with the pixel electrode in one of the sub-pixels, and the pixel electrodes in different sub-pixels are electrically connected with each other.

7. The pixel structure according to claim 3, wherein two TFTs are provided in each of the pixel unit, and each of the TFTs is electrically connected with the pixel electrodes in two sub-pixels, respectively.

8. The pixel structure according to claim 3, wherein two TFTs are provided in each of the pixel unit, each of the TFTs is electrically connected with the pixel electrode in one of sub-pixels, respectively, and the pixel electrode, which is electrically connected with the TFT, is electrically connected with the another pixel electrode, which is not electrically connected with the TFT.

9. The pixel structure according to claim 3, wherein four TFTs are provided in each of the pixel unit, and each of the TFTs is electrically connected with the pixel electrode in one of the sub-pixels.

10. The pixel structure according to claim 3, wherein the horizontal field is an in-plane field switching horizontal field or a fringe field switching horizontal field.

11. The pixel structure according to claim 2, wherein the slits in the sub-pixels which are not adjacent with each other, are parallel with each other.

12. The pixel structure according to claim 11, wherein the slits in adjacent sub-pixels are perpendicular with each other.

13. The pixel structure according to claim 11, wherein the slits in adjacent sub-pixels are symmetric with each other with respect to the gate line, and the slits in adjacent sub-pixels are symmetric with each other with respect to the data line.

14. The pixel structure according to claim 11, wherein one TFT is provided in each of the pixel unit, the TFT is electrically connected with the pixel electrode in one of the sub-pixels, and the pixel electrodes in different sub-pixels are electrically connected with each other.

15. The pixel structure according to claim 11, wherein two TFTs are provided in each of the pixel unit, and each of the TFTs is electrically connected with the pixel electrodes in two sub-pixels respectively.

16. The pixel structure according to claim 11, wherein two TFTs are provided in each of the pixel unit, each of the TFTs is electrically connected with the pixel electrode in one of sub-pixels respectively, and the pixel electrodes, which is electrically connected with the TFT, is electrically connected with another pixel electrode, which is not electrically connected with the TFT.

17. The pixel structure according to claim 11, wherein four TFTs are provided in each of the pixel unit, and each of the TFTs is electrically connected with the pixel electrode in one of the sub-pixels.

18. The pixel structure according to claim 11, wherein the horizontal field is an in-plane field switching horizontal field or a fringe field switching horizontal field.

* * * * *

UNITED STATES PATENT AND TRADEMARK OFFICE
CERTIFICATE OF CORRECTION

PATENT NO. : 7,894,031 B2
APPLICATION NO. : 12/128674
DATED : February 22, 2011
INVENTOR(S) : Jaikwang Kim It is certified that error appears in the above-identified patent and that said Letters Patent is hereby corrected as shown below:

We note the following typographical errors in Claim 1:

-in section 7, line 42, the expression "$[(n+1)\pi/2]+\theta$" was wrongly entered as "$[(n+2)\pi/2]+\theta$";

-in section 7, line 47, the expression "$(n\pi/2)+\theta$" was wrongly entered as "$n+/2+\theta$";

-in section 7, line 48, a "," is missed between "$\theta$" and "the angle"; and

-in section 7, line 52, the expression "$0\leq\theta\leq 90°$" was wrongly entered as "$0<\theta<90°$".

Signed and Sealed this
Seventh Day of June, 2011

David J. Kappos
*Director of the United States Patent and Trademark Office*